Nov. 14, 1944.   E. E. SIMMONS, JR   2,362,589
DYNAMOMETER AND EXTENSOMETER FOR IMPACT TESTING
Original Filed Feb. 23, 1940   6 Sheets-Sheet 1

INVENTOR
Edward E. Simmons, Jr.
BY
ATTORNEY

Nov. 14, 1944. E. E. SIMMONS, JR 2,362,589
DYNAMOMETER AND EXTENSOMETER FOR IMPACT TESTING
Original Filed Feb. 23, 1940 6 Sheets-Sheet 2
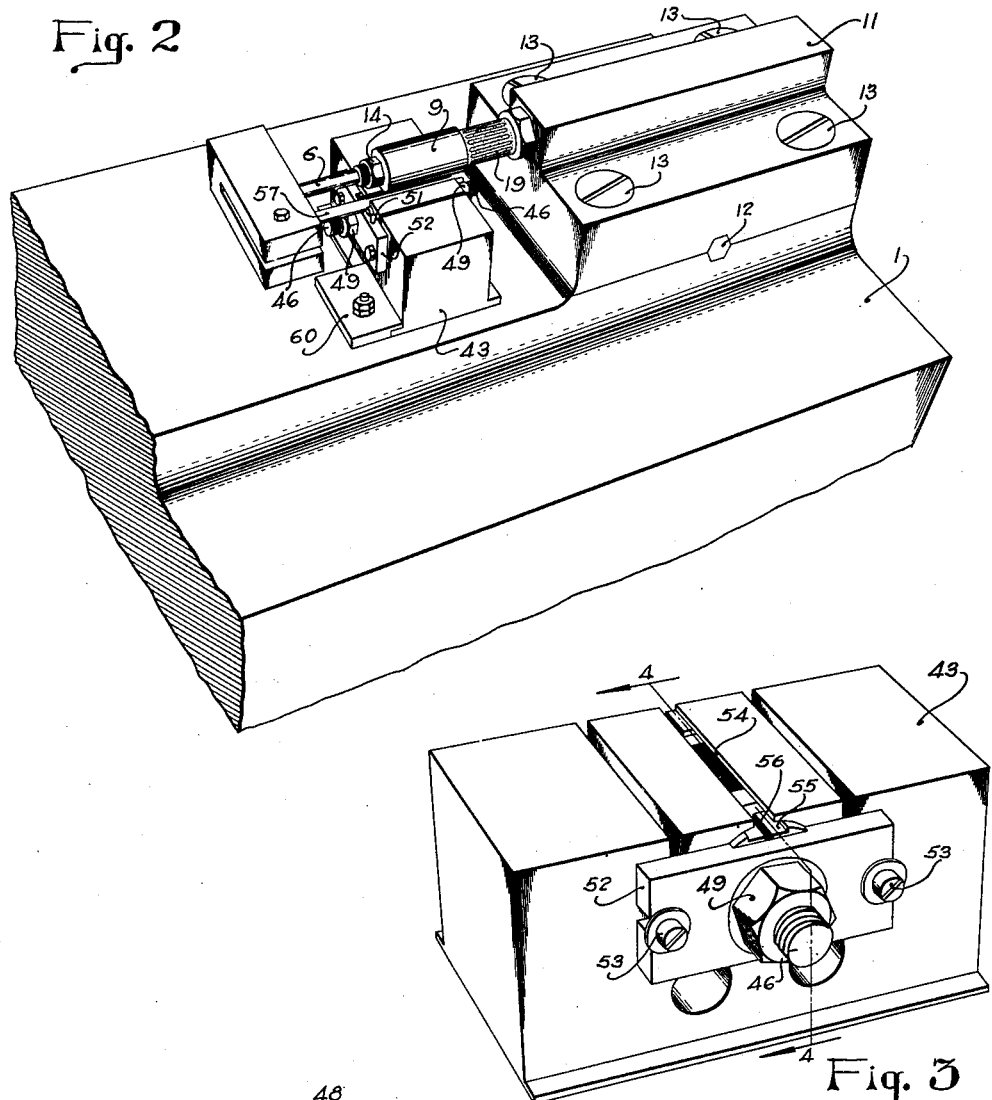
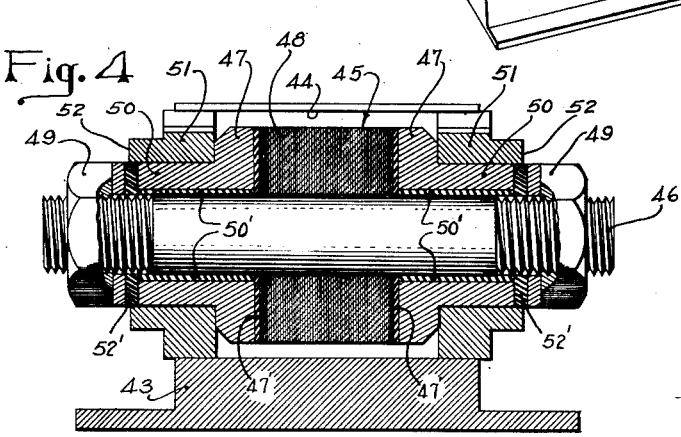
INVENTOR
Edward E. Simmons, Jr
BY
ATTORNEY Nov. 14, 1944. E. E. SIMMONS, JR 2,362,589
DYNAMOMETER AND EXTENSOMETER FOR IMPACT TESTING
Original Filed Feb. 23, 1940 6 Sheets-Sheet 3
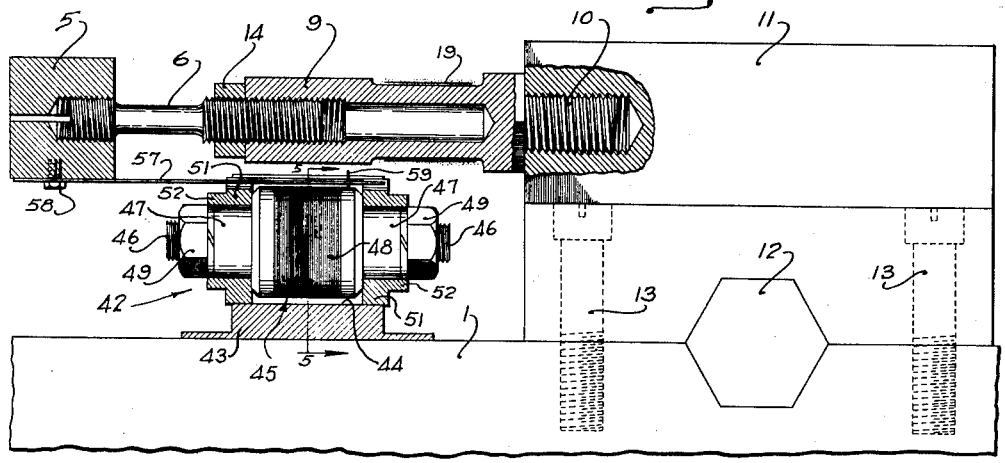
Fig. 7
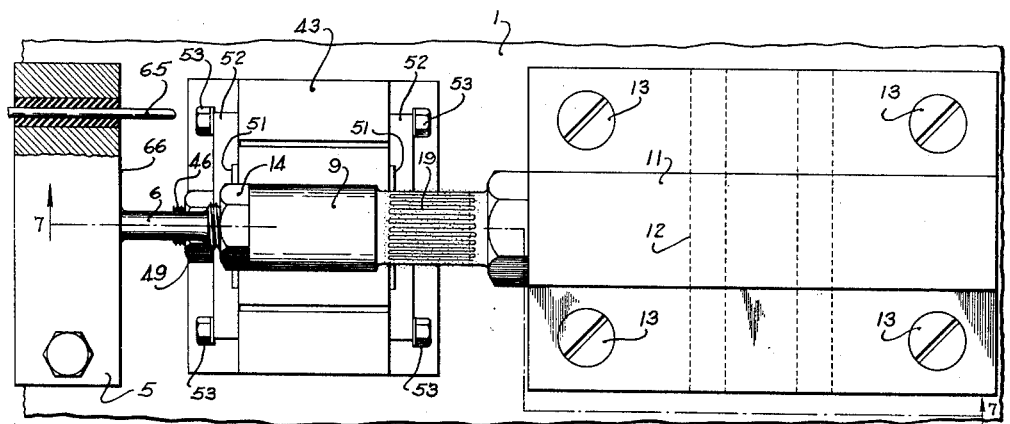
Fig. 6
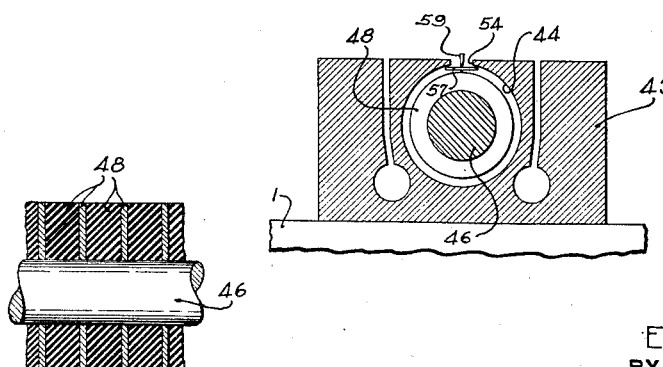
Fig. 5
Fig. 8
INVENTOR
EDWARD E. SIMMONS JR.
BY
ATTORNEY Nov. 14, 1944.   E. E. SIMMONS, JR   2,362,589
DYNAMOMETER AND EXTENSOMETER FOR IMPACT TESTING
Original Filed Feb. 23, 1940    6 Sheets-Sheet 4
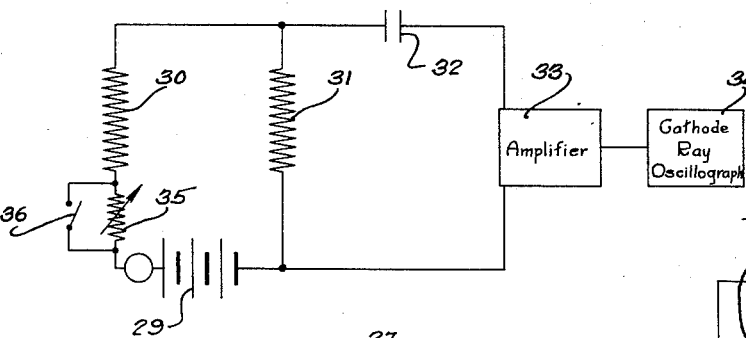
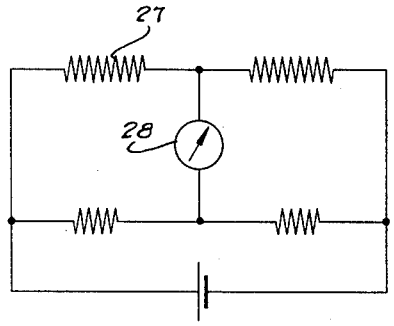
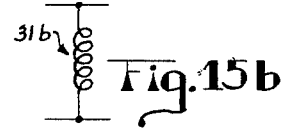
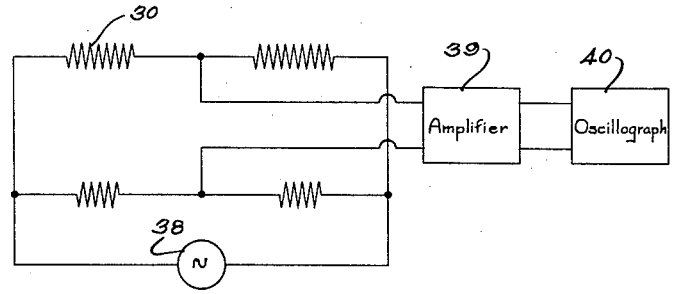
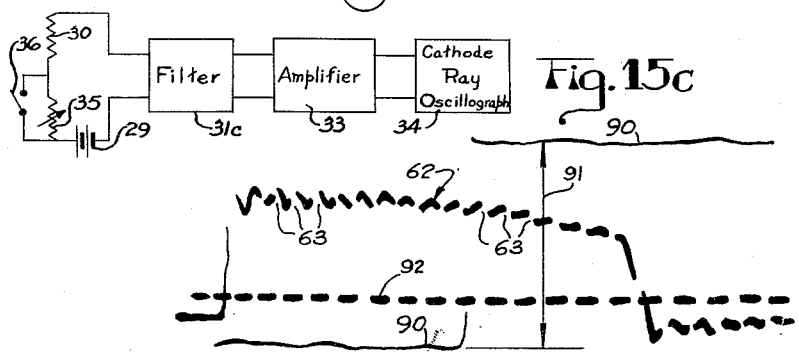
INVENTOR
EDWARD E. SIMMONS, JR.
BY
ATTORNEY

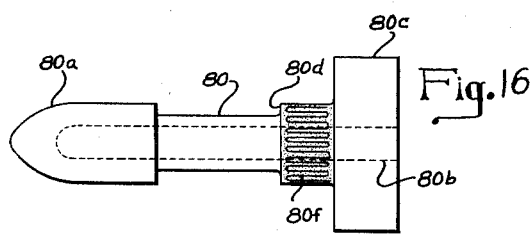
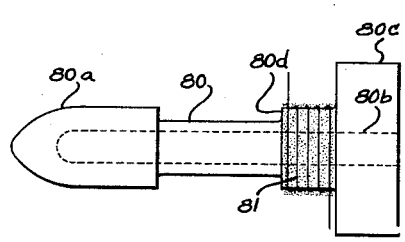
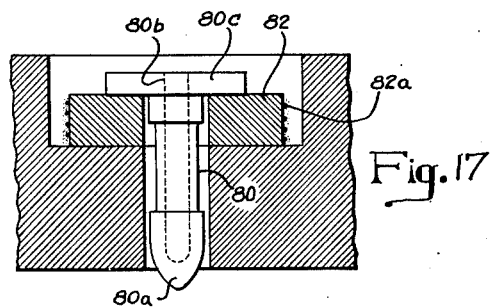
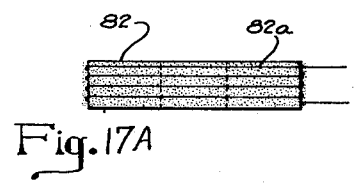
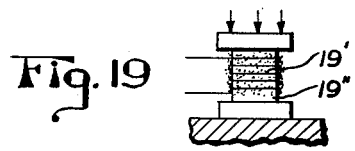
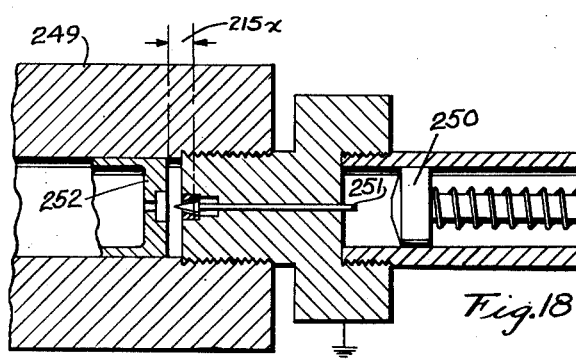

Patented Nov. 14, 1944

2,362,589

UNITED STATES PATENT OFFICE 2,362,589

DYNAMOMETER AND EXTENSOMETER FOR IMPACT TESTING

Edward E. Simmons, Jr., Pasadena, Calif.

Original application February 23, 1940, Serial No. 320,327. Divided and this application January 7, 1942, Serial No. 425,913

12 Claims. (Cl. 73—89)

This invention relates generally to materials testing apparatus and more particularly to electrical means for determining either the stress or strain characteristics of a specimen or member, my invention being illustrated particularly in connection with impact testing although it will be understood that the invention has various applications in the mechanical and/or materials testing field. This application is a division of my copending application Serial No. 320,327, filed February 23, 1940.

In impact testing it has been heretofore difficult, if not impossible, or at least inaccurately, to determine the actual stress created in a specimen when subjected to an impact load. One of the difficulties is that the specimen is normally broken in the test and also the speed of application of the test force involves the possibility of large inertia forces if usual force measuring devices are employed. Similar considerations are involved in any attempt to determine the strain of the specimen under an impact test. Instead of dealing with these difficulties the prior art has usually evaluated impact tests by the amount of energy required to break a specimen. This, however, gave no indication of the actual stress or strain produced in the specimen.

It is an object of my invention to provide an improved dynamometer for impact testing that is adapted in a simple, direct and highly accurate manner to determine the impact stress in a specimen.

Another object is to provide an improved extensometer for determining the strain or elongation of a specimen particularly during an impact test.

Other objects and advantages will be more apparent to those skilled in the art from the following description of the accompanying drawings in which:

Fig. 2 is an enlarged perspective of my improved dynamometer and extensometer;

Fig. 3 is an enlarged perspective of the extensometer;

Fig. 4 is a longitudinal section through the extensometer taken substantially on the line 4—4 of Fig. 3;

Fig. 5 is a transverse section of the extensometer taken substantially on the line 5—5 of Fig. 7;

Fig. 6 is a plan view of my improved apparatus;

Fig. 7 is a partial vertical longitudinal section taken substantially on the line 7—7 of Fig. 6;

Fig. 8 is a greatly enlarged axial section through a view of the commutator discs of the extensometer;

Figs. 10 to 12 are various forms of electrical circuits adapted to be employed in connection with the strain sensitive filament and the commutator type of extensometer;

Fig. 13 is a force-time diagram with strain superimposed thereon;

Figs. 15a, 15b, and 15c are modified arrangements that can be employed in the amplifier circuit;

Figs. 16, 16a, 17 and 17a are diagrammatic outlines of modified forms of bullet or projectile operated high impact dynamometers;

Fig. 18 is a fragmentary sectional view of certain control features of my improved projectile operated high impact machine; and Fig. 19 is a compression block dynamometer employing certain features for measuring an axial force as disclosed in one form of the impact dynamometer.

Figure 1:
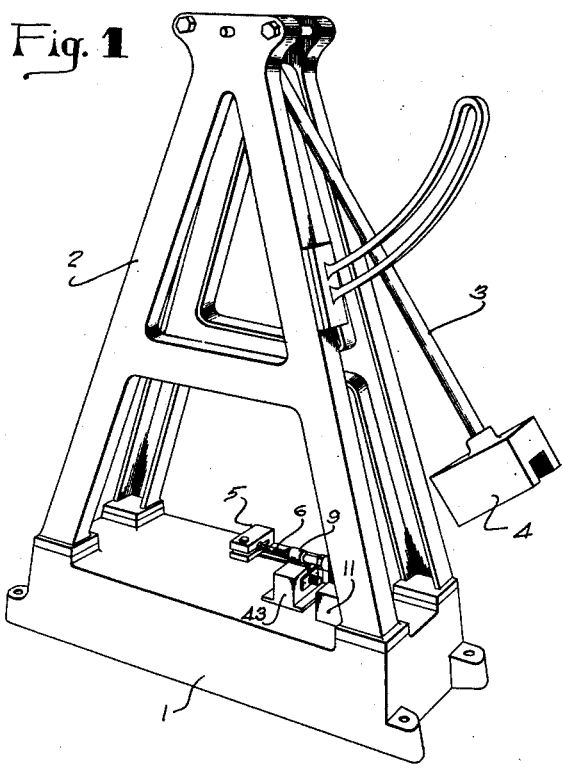
Fig. 1 is a perspective of one possible form of impact testing machine with which my invention is employed.

In the various embodiments of the invention such as are disclosed herein merely for the purpose of illustrating certain specific forms among possible others that the invention might take in practice, I have diagrammatically shown in Fig. 1 a well-known type of impact testing machine having a base 1, a frame 2, and a pendulum 3 provided with a grooved weight 4 which is adapted in the usual and well-known manner to swing downwardly and engage a tup 5 secured to a specimen 6, Fig. 7, thereby to impart an impact load to the specimen. Heretofore the impact load has been measured in terms of foot pounds of energy absorbed by the specimen, but the information gained by such a method is of limited value, and hence I have provided my improved electrical strain sensitive means whereby the actual instantaneous stress in the specimen may be determined with a high degree of accuracy notwithstanding that the stress varies at an exceedingly high rate of speed.

To measure the impact stress, I have provided a dynamometer bar or element 9, Fig. 7, preferably cylindrical and hollow and having a stem 10 threaded into a suitable base 11 which is adequately anchored to the main base 1 through a transverse key 12 and bolts 13. The other end of this element 9 is interiorly threaded to receive a threaded end of specimen 6 whose other threaded end is received in the tup 5. A lock nut 14 firmly holds the specimen in the dynamometer bar 9 so that the latter fully responds to the specimen load.

Figure 9:
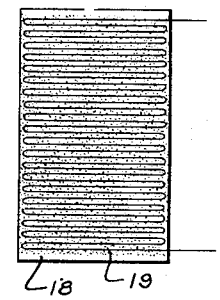
Fig. 9 is a preferred form of the electrical strain sensitive filament shown prior to being affixed to the dynamometer.

To determine the stress in the dynamometer element 9, I employ my improved strain sensitive electrical means which is fully disclosed in my copending application Serial No. 320,327, filed February 23, 1940, and which therefore need only be briefly referred to herein as consisting of a filament of very fine metallic wire 19, Fig. 9, that is continuously solid throughout its length and whose electrical strain characteristics are predetermined. This wire may be of suitable and well-known material such as "Constantan," "Advance" and other well-known materials having good resistance properties as well as being capable of fabrication in small wire sizes. The composition of such materials is well known and may be obtained from usual hand books on this subject. Also the strain sensitivity of various materials may be obtained from standard tables on this subject or readily determined by experiment. Hence it is not deemed necessary to describe such compositions or characteristics in detail herein as they are well-known. In certain work I have actually used a wire such as No. 40 gauge, approximately .0031 inch in diameter, such wire filament being preferably round although other shapes may be employed. The strain responsive filaments employ the well-known principle that the electrical resistance of materials varies with the strain thereof, herein referred to as "electrical strain sensitivity."

The form of filament arrangement (Fig. 9) employs a membrane preferably in the form of a piece of thin paper 18 with the filament 19 wound back and forth and secured thereto by "Glyptal" or other suitable adhesive insulating material. "Glyptal" is now placed on the surface of member 9 and the filament 19 wrapped around the same with the filament strands running in a direction axially of the member. The paper 18 is located on the outside of the filament, but the filaments are suitably insulated from the member 9 by a small amount of "Glyptal" that is initially placed on the member surface. If desired, the paper may be on the inside next to the surface of the member or specimen to be loaded. The filament and paper unit are held in position on member 9 by a suitable wrapping of thread. Thereupon the "Glyptal" is thoroughly dried and hardened. The filament can, of course, be applied directly to the dynamometer bar by hand winding and cementing.

To determine the load applied to a specimen, the dynamometer element 9 with the strain sensitive filament formed therewith is suitably calibrated as by being progressively loaded in a materials testing machine and observing the corresponding variations in electrical resistance of the strain sensitive filament. The variation in electrical resistance of the strain sensitive filament 19 may be determined by a usual Wheatstone bridge in which the filament constitutes one arm. Such a Wheatstone bridge, shown in Fig. 11, is adapted primarily for static calibration and static tests. The dynamometer filament is diagrammatically indicated at 27 while the other usual resistance arms of the bridge and the usual galvanometer 28 permits accurate balancing of the circuit when it is temporarily unbalanced by a change in resistance of filament arm 27.

It is necessary in an impact test, due to the extremely rapid rate of application of load, to employ an indicating circuit which is instantaneous in its load indication. This is best accomplished by the use of an oscillograph as shown in Fig. 10. The circuit therefor includes a 130 volt D. C. battery 29, dynamometer filament 30 and a ballast resistor 31. However, the ballast element 31 could be a constant current vacuum tube arrangement 31a, Fig. 15A, a choke 31b, Fig. 15B, or filter network 31C, Fig. 15C. In the latter case, compensation for the frequency characteristic of the dynamometer can be effected. A condenser 32 is included in the circuit to provide capacitance coupling in order to eliminate the DC component of the dynamometer voltage. An amplifier 33 and a cathode ray oscillograph 34 complete the circuit. The oscillograph record may be suitably photographed if desired which is found essential for practical purposes in impact testing because of the speed at which impact load is applied. In order to eliminate long time calibration changes arising in the amplifier-oscillograph or in the dynamometer circuit due to temperature effects and/or battery voltage changes, a precision variable resistor 35, shunted by a low resistance push button switch 36, is added in series with the dynamometer. The resistor 35 has a series of calibrated values corresponding to the change of resistance of the dynamometer in the range of forces used in testing. Thus by operating the oscillograph sweep and simultaneously opening switch 36 an oscillogram 90 of Fig. 13 is produced where the distance 91 of Fig. 13 corresponds to an equivalent change of dynamometer resistance. If a calibration trace is recorded on each test oscillogram, only the dynamometer and the calibration circuit 35, 36 need have long time stability.

In order to apply the strain sensitive elements to static or slowly changing stress or strain applications, the above mentioned D. C. bridge circuit, Fig. 11, can be used, wherein one arm contains the strain sensitive element 27 and a direct current indicating or recording electrical instrument 28 provides testing data. An alternating current bridge, as shown in Fig. 12, with the strain element 30 as one arm and alternating current source 38 is applicable to stress variations of any rate from zero upwards. The bridge output is a modulated alternating current signal of carrier frequency of source 38 and modulation envelope frequency corresponding to the variations in resistance of the strain element 30. This signal is easily amplified with an AC amplifier 39 to any desired level in order to operate any suitable or desirable indicating or recording apparatus 40 which in one specific aspect of the invention comprises an oscillograph.

*Extensometer.*—To determine the elongation of specimen 6, Fig. 7, with respect to the stress producing such elongation and thereby provide a stress-strain diagram for an impact test, I have provided an improved extensometer generally indicated at 42, Fig. 7, comprising a block 43 having a cylindrical bore 44. A circular commutator 45, Fig. 4, disposed within bore 44 has a shaft 46 provided with a pair of spaced collars 47 between which are clamped a series of alternate disc laminations 48 of insulating and electrical conducting materials such as Celluloid and aluminum foil respectively, or, if desired, condenser paper and tin foil may be used. These laminations are all firmly clamped together by nuts 49. The alternate layers of conductor discs are all in electrical contact with the shaft 46. Insulating sleeves 50' and insulating washers 52' together with insulating layers 47' serve to insulate the conductor disc and shaft assembly from the end collars 47 and the base of the device. The end collars 47 are also provided with sleeve portions 50 journalled in bearings 51 which also serve to center the commutator in its block 43 as by being received within the end portions of the bore 44 while end plates 52 formed as a part of bearings 51 are held in place by screws 53. It will be noted that the bearings 51 are of sufficient diameter to permit nuts 49 to pass therethrough thereby facilitating assembly of the commutator member 45 prior to its final assembly in the frame 43. A slot 54, Fig. 3, is formed in the top side of frame 43 axially of the commutator 45. The bearings 51 have flat guiding surfaces 55 extending backwardly beneath the edges of slot 54 while a further relatively narrow slot 56 is formed in the middle of the guiding surfaces 55. The surfaces 55 guide a relatively narrow flat but flexible metallic ribbon, Fig. 7, one end of which is removably secured as at 58 to the tup 5 while the other end is slidably supported on surfaces 55 beneath the edges of slot 54, Fig. 3. A marker element preferably in the form of a needle 59, Fig. 5, extends through and is suitably secured to the ribbon so as to engage the commutator laminations when pulled across the same. The center groove 56, Fig. 3, permits movement of the needle 59 into or out of the block 43 without injury. This commutator type of extensometer is firmly secured to the main base 1 as by a bolted clamp 60, Fig. 2, or other suitable means.

Figure 14:
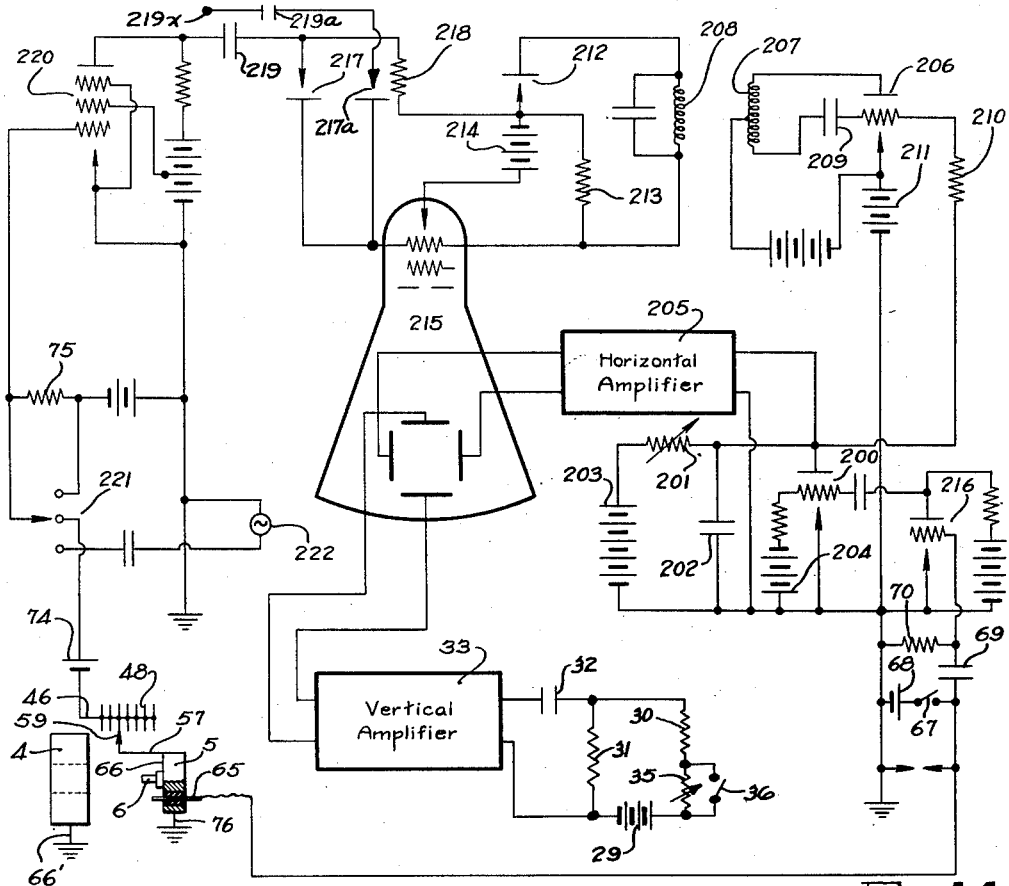
Fig. 14 is a wiring diagram for the oscillograph and associated equipment.

*Operation.*—With the apparatus set up as shown in Figs. 1, 2 and 7, when the impact load 4 hits the tup 5 the strain sensitive wires on member 9 will be strained therewith so as to cause the oscillograph 34 to record the variation in resistance occasioned by the elongation of the wire filament. Inasmuch as the change in resistance is in proportion to the strain and the strain is precalibrated in terms of force necessary to effect such changes in resistance, the oscillograph records the instantaneous values of force on a coordinate system whose other axis is time. The time axis is provided in the oscillograph by a special single sweep circuit which is initiated as described. A typical oscillogram is shown in Fig. 13. The force-time diagram is indicated at 62 where the vertical distance is proportional to force. In order to calibrate the horizontal or time axis a record is made by sweeping the cathode ray beam without a vertical signal but modulated at a known rate by an oscillator so as to produce equidistant marks in time 92. Now to impose upon this curve the factor of specimen strain the commutator shaft 47 and the tup 5 are connected as shown in Fig. 14 in series with a low voltage battery 74 and a load resistance 75. The variation of voltage across resistance 75 is coupled to the modulator grid of the cathode ray oscillographs so as to interrupt the cathode ray beam. So long as the current for this beam is continuous the oscillograph records a smooth force-time diagram, but if the current for this beam is successively momentarily interrupted as by needle 59 cutting over the insulation discs, then the successive interruptions 63 each represent the thickness of one insulated lamination. Hence, knowing the strain (elongation) with respect to time and knowing the load force with respect to time, it is possible to take the coordinate value of strain and force from the record and draw a usual stress-strain diagram for an impact load notwithstanding that the entire loading and breaking of the specimen occurs within a fraction of a second. After a test is run, the commutator is turned a fraction of a degree to present a new unscratched surface, it being understood that the needle makes a positive contact with the laminations by definitely scratching beneath the surface thereof.

It is desirable not to start the oscillograph until just before the impact blow is imparted to the specimen. To control initiation of the oscillograph, I have provided an impact control means including a solder pin 65 supported in and suitably insulated from tup 5 and projecting slightly ahead of the tup striking surface 66. When the weight 4 swings downwardly it will initially engage the tip of solder pin 65 and release the oscillograph trip through a circuit to be described. Solder or other soft material is used due to the more positive contact with the weight 4 due to the inelastic impact at the tip of the pin 65. The pin is pushed through the hole in the tup and thus does not interfere with the impact on the tup. The initiating circuit is diagrammatically shown in Fig. 14 wherein the weight 4 is suitably grounded as at 66' while the solder pin 65 is connected so as to discharge the condenser 69 through the resistor 70 to produce a sharp voltage impulse across the resistor 70 upon contact of the pin 65 with the base of the weight 4. This voltage impulse is used to trip the oscillograph sweep. The condenser is charged just prior to releasing the weight 4 by momentarily closing the switch 67.

*Circuit for oscillograph and associated equipment.*—The special electrical circuit above mentioned, Fig. 14, is used to control the electron beam of the cathode ray tube in the production of the single horizontal or time axis sweep and the modulated breaks in the oscillogram for extension measurements and time axis calibration. A customary relaxation sweep oscillator using a thyratron 200 in connection with a variable condenser-resistance combination 201, 202 and plate and grid voltage sources 203 and 204 respectively. As ordinarily used, this oscillator produces a succession of saw-tooth shaped waves which are amplified at 205 and applied to the horizontal deflection plates of the cathode ray tube 215 to provide a linear time axis. In the recording of transient phenomena, a mechanism is required which will produce a single horizontal sweep of the electron beam adjustable as to rate of sweep and time of initiation. The beam must be extinguished at all times except during the interval of the sweep, in order to prevent fogging of the photographic film. Such a mechanism must be entirely electrical as the time of exposure is usually shorter than one thousandth of a second. Such an arrangement is provided in Fig. 14 through an electrical circuit attached to the usual sweep oscillator of the cathode ray oscillograph. A combination oscillator and blocking circuit consists of vacuum tube 206, coils 207 and 208, grid condenser 209 and coupling resistor 210. Suitable voltage sources are indicated as batteries for simplification, although in practice the necessary voltages are secured from resistor and condenser networks fed by alternating current rectifier circuits. During quiescent periods, the condenser 202 is charged to a potential determined by the value of the cathode voltage 211 due to biased diode action of the grid-cathode circuit of vacuum tube 206. The voltage across the condenser 202 and hence the plate voltage of the thyratron 200 is limited by the grid current of vacuum tube 206 through the resistor 201. The cathode voltage 211 is adjusted to provide a voltage across condenser 202 of about 60 volts and the grid bias of the thyratron is adjusted to just prevent ionization for this voltage. Under the condition above the condenser 202 voltage remains constant and the conditions at the high frequency oscillator involving vacuum tube 206 permit sustained oscillations in coil 207. A secondary coil 208 is magnetically coupled to coil 207 and tuned to resonate at the oscillator frequency. The voltage across coil 208 is rectified by diode vacuum tube 212 to provide a direct current voltage across resistor 213. This resistor voltage is connected in series with the grid bias source 214 of the cathode ray tube 215 and is of proper magnitude and polarity to cause cut-off of the electron stream of the cathode ray tube. As the cathode and associated circuits of a cathode ray tube are normally operated several thousand volts above ground, direct connection of grid circuits to apparatus operated at near ground potentials is not feasible. The high frequency magnetically coupled circuit described above permits an easily insulated static control means for the cathode ray grid circuit. In a particular installation, the frequency of the control oscillator was about 10 megacycles. Coupling, filtering and interference difficulties are eliminated through the use of such frequencies.

Under quiescent conditions, the would-be position of the beam spot on the cathode ray tube screen is biased to the edge of the screen through the usual beam centering control.

In action the circuit operates as follows: a tripping impulse as initiated by the pendulum 4 striking the pin 65 to provide the impulse voltage across resistor 70 as described above, is amplified by amplifier involving tube 216 and coupled to the grid of the thyratron 200. As mentioned above, the grid voltage of the thyratron is just slightly more negative than the critical grid voltage. Thus a pulse at positive polarity will cause ionization of the thyratron which in turn causes a very rapid discharge of the condenser 202. Since the condenser voltage is amplified at 205 and applied to the horizontal deflection plates of the cathode ray tube 215, the cathode ray spot is suddenly carried to the opposite side of the cathode ray tube screen from its rest position. At the same time the loss of voltage on condenser 202 results in a high negative voltage on the grid of tube 206 with respect to its cathode as may be readily seen by following through the grid to cathode circuit. As a result of this grid voltage the high frequency oscillator is blocked and the potential it provided in the cathode ray tube grid circuit disappears, permitting a normal electron beam to strike the fluorescent screen. Following discharge, the condenser 202 again becomes charged at a rate determined by the capacitance of the condenser 202, the resistor 201 and the voltage 203. The approximately linear voltage rise across the condenser 202 is amplified at 205 and applied to the cathode ray tube deflection plates to cause a linear motion of the beam spot across the screen, thus providing a linear time axis. When the condenser 202 voltage approaches the predetermined quiescent value the high frequency oscillator again becomes operative because of the return of normal grid voltage conditions. The electron beam is thus extinguished. The high frequency oscillator is specially designed to be unstable so as to make resumption of oscillations a critical function of condenser 202 voltage. Thus through the application of an initiating pulse the cathode ray beam is carried across the screen suddenly, the beam turned on, the beam carried linearly back across the screen at any desired rate and the beam extinguished at the end of the trace. The vertical axis of the oscillograph is operated from the usual vertical amplifier 33 from the signal provided by the dynamometer electrical circuit described elsewhere.

Besides extinguishing the cathode ray beam when the sweep is inactive, it is desirable to make use of a beam modulation scheme during the sweep in order to provide a third information axis for the oscillograms. An isolating diode vacuum tube 217 and leak resistor 218 provides a method of applying negative pulses to the cathode ray tube grid circuit without disturbing the beam extinguishing circuit. These pulses are coupled to the diode circuit through a high voltage isolating condenser 219. An amplifier involving tube 220 is used to amplify the pulses produced by the extensometer commutator as previously described. The circuit must be arranged so that the pulses are of negative polarity at the diode input. A switching arrangement is shown at 221 to permit the use of an oscillator 222 for calibrating the time axis. Through the use of additional diode isolating elements like 217 and which are diagrammatically indicated at 217a, Fig. 19, with its component coupling resistor 218a and condenser 219a other circuits can be coupled as at 219x to the cathode ray tube grid so as to cause no interference with other circuits connected to the same grid but at the same time permit modulation of the beam intensity.

*Projectile operated impact dynamometer.*—Some other forms which the dynamometer has taken are illustrated in Figs. 16 to 17a in connection with my high speed projectile operated machine. Fig. 16 shows a hollow cylindrical specimen 80 having an enlarged closed end 80a for receiving the impact of a bullet fired from a gun into the open end 80b which extends through a supporting flange 80c. The force dynamometer has an enlarged cylindrical boss 80d made integral with the specimen and provided with a strain sensitive filament as at 80f. This filament extends axially of specimen 80 and is placed in a zigzag manner around the circumference thereof whereas in Fig. 16a the filament 81 is helically wrapped around the boss so that the axis of the filament is circumferential. The integral specimen dynamometer is precalibrated by straining the specimen up to its elastic limit and forces beyond this, as obtained during a test, are determined by extrapolation of the dynamometer calibration. The feature of this arrangement is that the dynamometer boss is sufficiently larger than the specimen gauge length diameter so that purely elastic conditions always exist in the dynamometer boss. Thus a linear relation obtains between specimen forces and the dynamometer resistance values at all times during a testing cycle even when the gauge length of the specimen is subject to strains beyond its elastic limit. Since it is not desired to strain a specimen beyond its elastic limit before a test, the integral dynamometer is calibrated only for a series of forces up to that corresponding to the elastic limit of the specimen gauge length. Since the dynamometer calibration is a linear function, extrapolation for forces larger than those permitted in calibration is without appreciable error.

Figs. 17 and 17a illustrate a washer type compression dynamometer for the high speed machine mentioned above. The flange 80c rests on a washer 82. A helical winding 82a which may be non-inductive is wound around the axis of the washer shaped dynamometer bar 82 and cemented to the surface. A compression loading as occurs when the specimen is broken results in expansion of the cylindrical surface upon which is cemented the filament winding, which in turn causes a proportionate change of the winding resistance.

In my projectile operated high impact machine, force-time diagrams such as shown in Fig. 13 are recorded by initiating the oscillograph sweeps through an electrical contact in the firing mechanism of a gun 249. To do this a striker 250, Fig. 18, is insulated from ground and is connected to the same terminal in the oscillograph trip circuit, Fig. 14, as the solder pin 65 in the pendulum machine case. The contact of the striker head with the firing pin 251, in firing, just precedes the ignition of the powder charge. Thus the sweep is started prior to the rise of pressure in the gun chamber. The firing pin is pressed against a stop by the primer of the shell 252. Additional delay may be secured by using the firing pin 251 in a manner similar to that of the solder pin in the pendulum machine set-up. That is, the firing pin 251 would be moved back a suitable distance 215x so as to contact the striker before impacting the percussion cap.

While my invention is disclosed particularly for impact testing, yet it is apparent that my improved strain commutator type extensometer can be employed in other types of tests either in cooperation with a strain sensitive filament or separately as circumstances may require.

In a further filament arrangement used in making a dynamometer for compression forces, Fig. 19, a filament strand 19' is wound directly on the cylindrical surface of a dynamometer member 19" in a helical form and cemented in place. Insulation is obtained through the use of insulated wire and precoating of the dynamometer surface with a thin insulating layer. The filament can, of course, be applied directly to the dynamometer bar by hand winding and cementing.

It will of course be understood that various changes in details of construction and arrangement of parts may be made by those skilled in the art without departing from the spirit of the invention as set forth in the appended claims.

I claim:

1. In combination, an impact dynamometer bar having one of its ends anchored and the other end supporting a specimen, a tup secured to the specimen to receive an impact blow and thereby transmit the blow through the specimen to said dynamometer bar, and a continuous solid filament of electrical conducting material whose electrical resistance varies with its strain, said filament being bonded throughout its effective length to said dynamometer bar so as to be responsive to the strain therein, thereby to determine the impact load actually transmitted to the specimen.

2. In combination, an impact dynamometer bar to which a specimen is adapted to be connected, electrical impedance means connected to said dynamometer bar and whose impedance varies with strain of the dynamometer bar thereby to determine the impact stress applied to a specimen, means responsive to the strain of the specimen, and means controlled by said electrical impedance means and by said strain responsive means for indicating the stress-strain characteristics of the specimen during impact loading.

3. In combination, a dynamometer bar to which a specimen is adapted to be connected, electrical impedance means connected to said dynamometer bar and whose impedance varies with strain of the dynamometer bar thereby to determine the stress applied to a specimen, means responsive to the strain of the specimen including a commutator with alternate laminations of electrical conducting and non-conducting materials and a member movable across said commutator upon occurrence of deformations of the specimen, and an electrical stress-strain recording circuit controlled by said stress responsive impedance means and also by said commutator whereby when said movabe member moves over said commutator laminations it causes the circuit to be responsive to the variations in the strain of the specimen, thereby to determine the stress-strain characteristics of the specimen during loading thereof.

4. In combination, an impact dynamometer bar to which a specimen is adapted to be connected, electrical impedance means connected to said dynamometer bar and whose impedance varies with strain of the dynamometer bar thereby to determine the impact stress applied to the specimen, means responsive to the strain of the specimen incuding a commutator provided with alternate laminations of electrical conducting and non-conducting materials and a member directly connected to the specimen and movable across said commutator in contact therewith upon occurrence of deformation of the specimen thereby to produce make and break electrical contacts as the laminations are passed over, and an electrical stress-strain recording circuit controlled by said stress responsive impedance means and also by said commutator whereby when said movable member moves over said commutator laminations it causes the circuit to be responsive to the variations in strain of the specimen, thereby to determine the stress-strain characteristics of the specimen during loading thereof.

5. In combination, an impact dynamometer bar to which a specimen is adapted to be connected, electrical strain responsive means connected to said bar so as to be responsive to stress as a result of strain in the bar, indicating means controlled by said electrical means so as to indicate the stress imposed upon a specimen connected to said dynamometer, and means for also controlling said indicating means by a circuit which is intermittently made and broken in response to the deformation of the specimen when subjected to an impact blow thereby to determine the stress-strain characteristics of the specimen.

6. In combination, a dynamometer bar to which a specimen is adapted to be connected, electrical means for determining the stress applied to a specimen in accordance with strain in the dynamometer bar, indicating mechanism controlled by said electrical means so as to produce a force-time curve, and means responsive directly to the deformation of said member for interrupting said force-time curve for each predetermined increment of deformation in the member, whereby the composite force-time curve with the superimposed deformation indications thereon provides a basis for determining the stress-strain characteristics of the specimen.

7. In combination, an impact dynamometer bar having electrical means for determining the impact stress applied to a specimen which is connected to said bar, means for applying an impact load to the specimen, an indicating means controlled by said electrical means so as to produce a force-time curve, and means responsive directly to the deformation of the specimen for interrupting said force-time curve for each predetermined increment of deformation in the specimen, whereby the composite force-time curve with the superimposed deformation indications thereon provides a basis for determining the stress-strain characteristics of the specimen.

8. The combination set forth in claim 7 further characterized in that the electrical means for determining the impact stress comprises a continuous solid filament of electrical conducting material whose electrical resistance varies with its strain and said filament is bonded throughout its effective length to the dynamometer bar so as to be responsive to strain induced therein by the impact load.

9. The combination set forth in claim 7 further characterized in that the means responsive directly to the deformation of the specimen comprises a commutator having alternate laminations of electrical conducting and non-conducting materials and a contact element connected to the specimen so as to move in accordance with strain thereof and adapted to move across and cut into the successive laminations to establish the interruption of the force-time curve.

10. The combination set forth in claim 7 further characterized in that the means responsive directly to the deformation of the specimen comprises a commutator having alternate laminations of electrical conducting and non-conducting materials and a contact element connected to the specimen so as to move in accordance with strain thereof and adapted to move across and cut into the successive laminations to establish the interruption of the force-time curve, and means for rotatably supporting said commutator whereby it may be rotated to provide a new position for the contact member during each successive test.

11. In combination, an impact loading member, an impact dynamometer connected to a specimen, a tup adapted to receive an impact blow from said loading member to transmit the impact to the specimen, an electrical contact pin adapted to be engaged by said loading member just prior to the time when an impact blow is imparted to the tup, said pin being movabe upon an impact blow being imparted thereto to allow the blow to be transmitted fully to the tup and thence to the specimen, means for indicating the impact stress applied to the specimen, and an electrical circuit for initiating operation of said indicating means including said contact pin whereby the circuit is controlled by the engagement of the loading member with said pin.

12. In combination, an input loading member, an impact dynamometer connected to a specimen, an electrical contact pin adapted to be engaged by said loading member just prior to the time when an impact blow is imparted to the specimen, means for indicating the impact stress applied to the specimen, and an electrical circuit for initiating operation of said indicating means including a condenser adapted to discharge an impulse of initiating current to said indicating means when the loading member contacts said pin.

EDWARD E. SIMMONS, Jr.